(12) United States Patent
Walker et al.

(10) Patent No.: US 10,385,713 B2
(45) Date of Patent: Aug. 20, 2019

(54) SEAL ASSEMBLY FOR GAS TURBINE ENGINES

(71) Applicant: United Technologies Corporation, Farmington, CT (US)

(72) Inventors: Brady Walker, Glastonbury, CT (US); Gregory S. Piehler, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/685,026

(22) Filed: Aug. 24, 2017

(65) Prior Publication Data

US 2019/0063247 A1 Feb. 28, 2019

(51) Int. Cl.
| | |
|---|---|
| *F16J 15/44* | (2006.01) |
| *F01D 11/00* | (2006.01) |
| *F16J 15/34* | (2006.01) |
| *F16J 15/30* | (2006.01) |
| *F16J 15/3268* | (2016.01) |
| *F16J 15/453* | (2006.01) |

(52) U.S. Cl.
CPC ............. *F01D 11/003* (2013.01); *F16J 15/30* (2013.01); *F16J 15/3268* (2013.01); *F16J 15/3472* (2013.01); *F16J 15/453* (2013.01); *F05D 2240/55* (2013.01)

(58) Field of Classification Search
CPC ...... F01D 11/003; F16J 15/30; F16J 15/3268; F16J 15/453
See application file for complete search history.

(56) References Cited

U.S. PATENT DOCUMENTS

| | | | | |
|---|---|---|---|---|
| 3,218,110 | A * | 11/1965 | Conner ................... | F16C 33/78 277/353 |
| 3,278,191 | A * | 10/1966 | Gits ......................... | F16J 15/38 277/373 |
| 3,647,227 | A * | 3/1972 | Lojkutz ................... | F16J 15/38 277/373 |

(Continued)

FOREIGN PATENT DOCUMENTS

| | | |
|---|---|---|
| CN | 105276192 | 1/2016 |
| EP | 2604802 A1 | 6/2013 |
| EP | 3282153 A1 | 2/2018 |

OTHER PUBLICATIONS

European Search Report for European Application No. 18190748.6, dated Dec. 17, 2018.

*Primary Examiner* — Gilbert Y Lee
(74) *Attorney, Agent, or Firm* — Carlson, Gaskey & Olds, P.C.

(57) ABSTRACT

A seal assembly for a gas turbine engine according to an example of the present disclosure includes, among other things, a seal housing that extends about an axis. The seal housing defines an annular groove. A contacting-type seal is at least partially received in the annular groove. The seal includes a seal member and a seal carrier that extends about and mechanically attaches to an outer diameter of the seal member. The seal member defines an annular seal face that is moveable along the axis to abut against a seal seat. The seal member includes a first material, and the seal carrier includes a second, different material.

20 Claims, 4 Drawing Sheets

(56) References Cited

U.S. PATENT DOCUMENTS

| | | | |
|---|---|---|---|
| 8,714,557 B2* | 5/2014 | Miller | F16J 15/3472 277/372 |
| 2014/0159317 A1 | 6/2014 | Jahn | |
| 2015/0337674 A1 | 11/2015 | Sonokawa et al. | |

* cited by examiner

SEAL ASSEMBLY FOR GAS TURBINE ENGINES

BACKGROUND

This application relates to sealing for a gas turbine engine, including seal assemblies that seal against rotatable portions of the engine.

Gas turbine engines are known, and typically include a fan delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

Bearing compartments typically receive fluid for cooling and lubricating one or more bearings. The bearing compartment may include one or more seals that fluidly separate the bearing compartment from an adjacent cooling air cavity.

SUMMARY

A seal assembly for a gas turbine engine according to an example of the present disclosure includes a seal housing that extends about an axis. The seal housing defines an annular groove. A contacting-type seal is at least partially received in the annular groove. The seal includes a seal member and a seal carrier that extends about and mechanically attaches to an outer diameter of the seal member. The seal member defines an annular seal face that is moveable along the axis to abut against a seal seat. The seal member includes a first material, and the seal carrier includes a second, different material that has a greater density than the first material.

In a further embodiment of any of the foregoing embodiments, the first material of the seal member comprises carbon.

In a further embodiment of any of the foregoing embodiments, the second material of the seal carrier comprises metal.

A further embodiment of any of the foregoing embodiments includes a spring member received in the annular groove, wherein the spring member abuts against the seal carrier and biases the seal member against the seal seat.

In a further embodiment of any of the foregoing embodiments, the seal carrier includes an annular carrier body that extends between a first end portion and a second end portion to define the outer diameter of the seal carrier, and includes an annular shoulder that extends inwardly from carrier body. The seal member includes an annular seal body and an annular contacting portion. The seal body abuts against a shoulder of the seal housing. The contacting portion extends axially from the seal body to define the seal face, and the contacting portion has a lesser inner diameter and a lesser outer diameter with respect to the seal body.

In a further embodiment of any of the foregoing embodiments, the seal member is press fit into an inner diameter of the seal carrier.

A further embodiment of any of the foregoing embodiments includes a secondary seal member extending from the seal housing. One of the seal carrier and the seal member defines a secondary seal seat that abuts against the secondary seal member to at least partially seal the annular groove.

In a further embodiment of any of the foregoing embodiments, the seal includes a secondary portion that defines the secondary seal seat.

In a further embodiment of any of the foregoing embodiments, one of the seal member and the seal carrier defines the secondary portion, with the secondary portion being elongated along the axis.

In a further embodiment of any of the foregoing embodiments, the seal carrier includes one or more scallops circumferentially distributed about an outer diameter of the seal carrier, and the seal housing defines one or more retention hooks receiving a respective one of the one or more scallops to oppose movement of the seal carrier relative to the seal housing.

A further embodiment of any of the foregoing embodiments includes a spring member received in the annular groove. The spring member abuts against the seal carrier and biases the seal member against the seal seat. The spring member biases the one or more scallops against the one or more retention hooks.

A gas turbine engine according to an example of the present disclosure includes a fan section that has a fan rotatable about an engine axis, a compressor section in fluid communication with the fan section, a turbine section driving the fan section, and a seal assembly that has a seal housing, and a contacting-type seal that extends about the engine axis. The seal has a seal member mechanically attached to a seal carrier. The seal carrier is slideably received in the seal housing. The seal member defines a seal face that is moveable along the axis to abut against a rotatable seal seat. The seal member includes a first material comprising carbon, and the seal carrier includes a second, different material.

In a further embodiment of any of the foregoing embodiments, the second material has a greater density than the first material.

In a further embodiment of any of the foregoing embodiments, the second material of the seal carrier comprises metal.

In a further embodiment of any of the foregoing embodiments, the seal housing is mechanically attached to a static structure of the engine.

A further embodiment of any of the foregoing embodiments includes a bearing assembly that has at least one bearing located in bearing compartment and a rotatable member defining the seal seat.

A further embodiment of any of the foregoing embodiments includes a spring member received in an annular groove defined by the seal housing. The spring member biases the seal member against the seal seat. A secondary seal member extends from the seal housing. One of the seal carrier and the seal member defines a secondary seal seat that abuts against the secondary seal member to at least partially seal the annular groove between a first axial position and a second, different axial position relative to the engine axis.

A method of sealing for a gas turbine engine according to an example of the present disclosure includes establishing a first sealing relationship along a fluid passage in response to contact between a contacting-type seal and a seal seat. The contacting-type seal includes a seal member mechanically attached to a seal carrier. The seal member defines a seal face that is moveable to abut against the seal seat. The seal member has a first material comprising carbon, and the seal carrier includes a second, different material that has a greater density than the first material.

A further embodiment of any of the foregoing embodiments includes establishing a second sealing relationship along the fluid passage between a secondary seal seat defined by the contacting-type seal and a seal housing that is attached to a static structure.

In a further embodiment of any of the foregoing embodiments, the step of establishing the first sealing relationship includes biasing the seal carrier away from the seal housing such that the seal face directly contacts the seal seat during relative rotation of the seal seat and the seal face.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
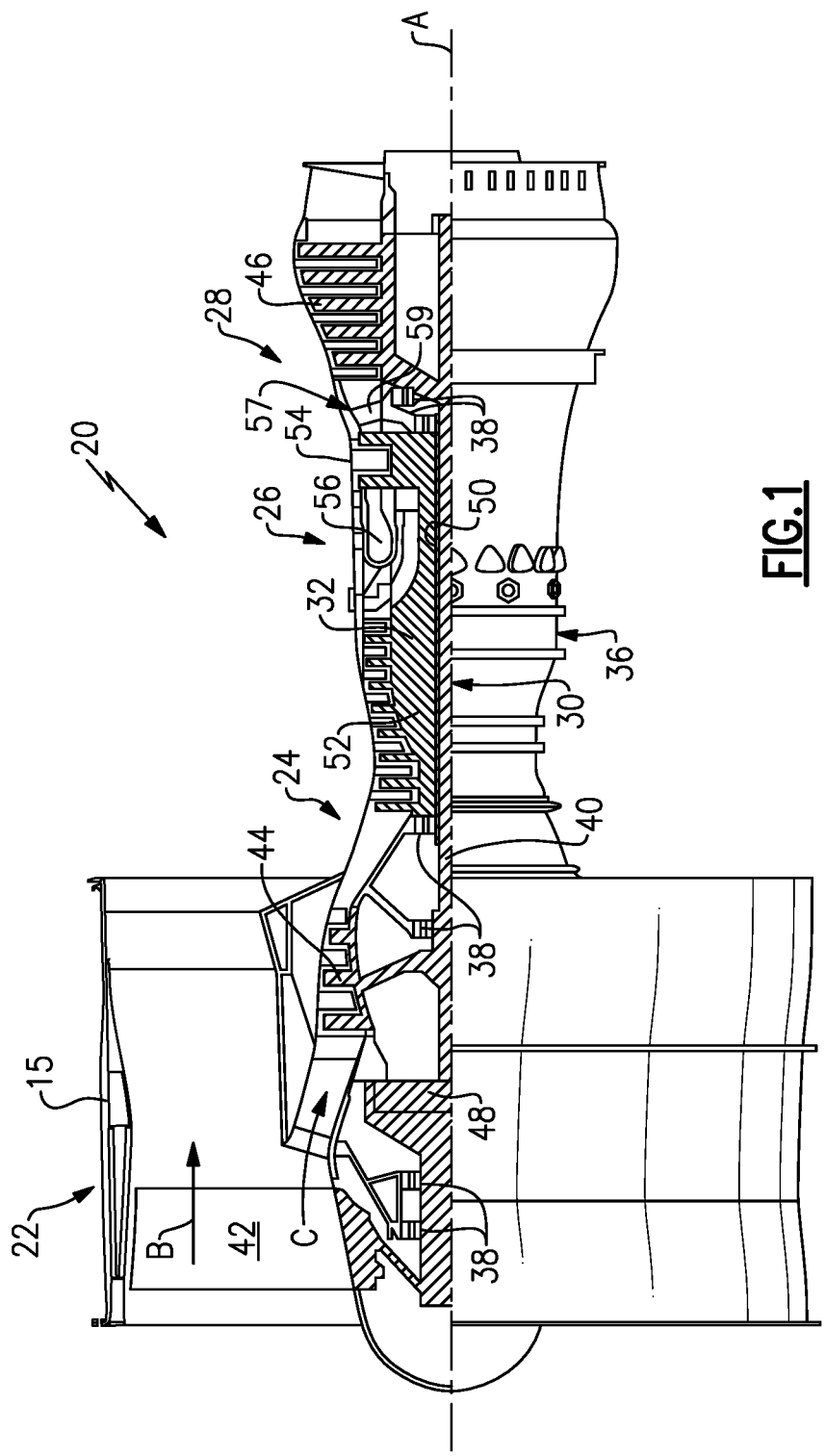
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the embodiments of the present invention are applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
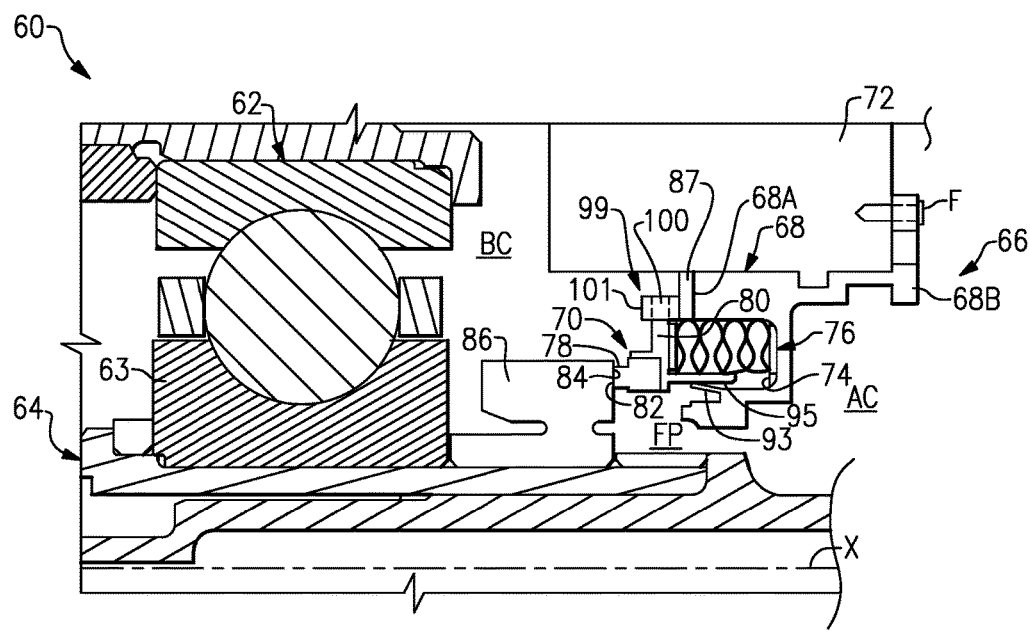
FIG. 2 illustrates a bearing assembly.

FIG. 2 illustrates a bearing assembly 60 according to an example. The bearing assembly 60 can be incorporated into the gas turbine engine 20, such as one of the bearing systems 38 (FIG. 1), for example. Other components of the engine 20 and other systems may benefit from the teachings herein, such as a towershaft coupled to one of the shafts 40, 50 for driving an auxiliary power unit, fluid paths established between rotating and static components, and bearing arrangements within industrial land based turbines.

The bearing assembly 60 includes one or more bearings 62 (one shown for illustrative purposes) situated in a bearing compartment BC. The bearing compartment BC can be defined at one or more of the locations of bearing systems 38, such as by geared architecture 48 (FIG. 1). The bearing 62 can include one or more components such as a bearing carrier 63 including rotatable and static portions for supporting rotatable components of the bearing 62. In the illustrated example, the bearing 62 is a ball bearing. Other example bearings can include roller bearings and taper bearings. The bearing 62 supports a shaft 64 that is situated along a longitudinal axis X. The shaft 64 can be inner shaft 40 or outer shaft 50 of the spools 30, 32 (FIG. 1), for example. The shaft 64 can include one or more portions mechanically attached to each other for rotation about the longitudinal axis X. The longitudinal axis X can be coaxial with, or parallel to, the engine central longitudinal axis A (FIG. 1).

The bearing assembly 60 includes a seal assembly 66 bounding or otherwise defining a perimeter of the bearing compartment BC. In this disclosure, like reference numerals designate like elements where appropriate and reference numerals with the addition of one-hundred or multiples thereof designate modified elements that are understood to incorporate the same features and benefits of the corresponding original elements. The seal assembly 66 can be configured to fluidly separate the bearing compartment BC from an adjacent airflow cavity or compartment AC that can be supplied with pressurized cooling airflow for cooling various components of the engine 20. The seal assembly 66 contains or otherwise opposes migration of fluid such as lubricant from the bearing compartment BC to the airflow compartment AC along portions of a fluid passage FP.

The seal assembly 66 includes a seal housing 68 and a contacting-type seal 70. The seal housing 68 can be attached to a static structure such as case 72, or a portion of engine static structure 36 (FIG. 1). The seal housing 68 can be mechanically attached to the case 72 by one or more fasteners F, for example. For the purposes of this disclosure, a "contacting-type" seal means a seal that establishes and maintains a sealing relationship through direct contact between two adjacent components. In contrast, a "non-contacting-type" seal means a seal that establishes and maintains a sealing relationship through hydrostatic and/or hydrodynamic principles subsequent to engine startup.

The seal housing 68 extends about the longitudinal axis X and has a generally arcuate or ring-shaped geometry. The seal housing 68 defines an annular groove 74. The annular groove 74 is swept about the axis X and at least partially receives the seal 70. The groove 74 can be dimensioned to open towards the bearing compartment BC, for example.

The seal assembly 66 includes a spring member 76 that is received in the annular groove 74. The spring member 76 can be a wave spring that is distributed about the axis X, for example. The spring member 76 defines a spring load that is based on a mass and moment of inertia of the seal 70.

The bearing assembly 60 includes a rotatable member 86 that defines a rotatable seal seat 84. The spring member 76 biases the seal 70 toward the seal seat 84, and resists movement of the seal 70 away from the seal seat 84.

The seal 70 includes a seal member 78 and a seal carrier 80 arranged as a floating ring that is moveable along the axis X. The seal member 78 defines an annular seal face 82 that is moveable along the axis X to abut against or directly contact the seal seat 84. The spring member 76 abuts against the seal carrier 80 and biases the seal member 78 against the seal seat 84.

The seal 70 can be secured in the annular groove 74 by a retention member 87. The retention member 87 is dimensioned to abut against the seal carrier 80 to limit movement of the seal 70 along the axis X. The retention member 87 can have a generally ring-shaped geometry and can be mechanically attached to the seal housing 68 using one or more fasteners, for example. In other examples, the retention member 87 is attached with fasteners to the engine case or surrounding static hardware along the axis X. In the illustrated example of FIG. 2, the retention member 87 and the seal housing 68 are separate and distinct components. In alternative examples, the seal housing 68 and the retention member 87 are integrally formed.

Figure 3B:
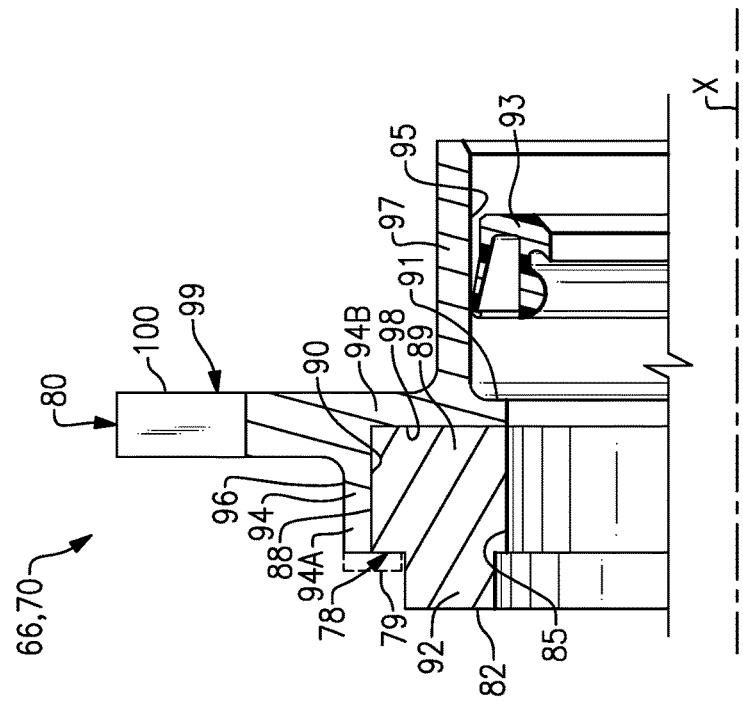
FIG. 3B illustrates a sectional view of the seal assembly of FIG. 3A along line 3B-3B.
Figure 3A:
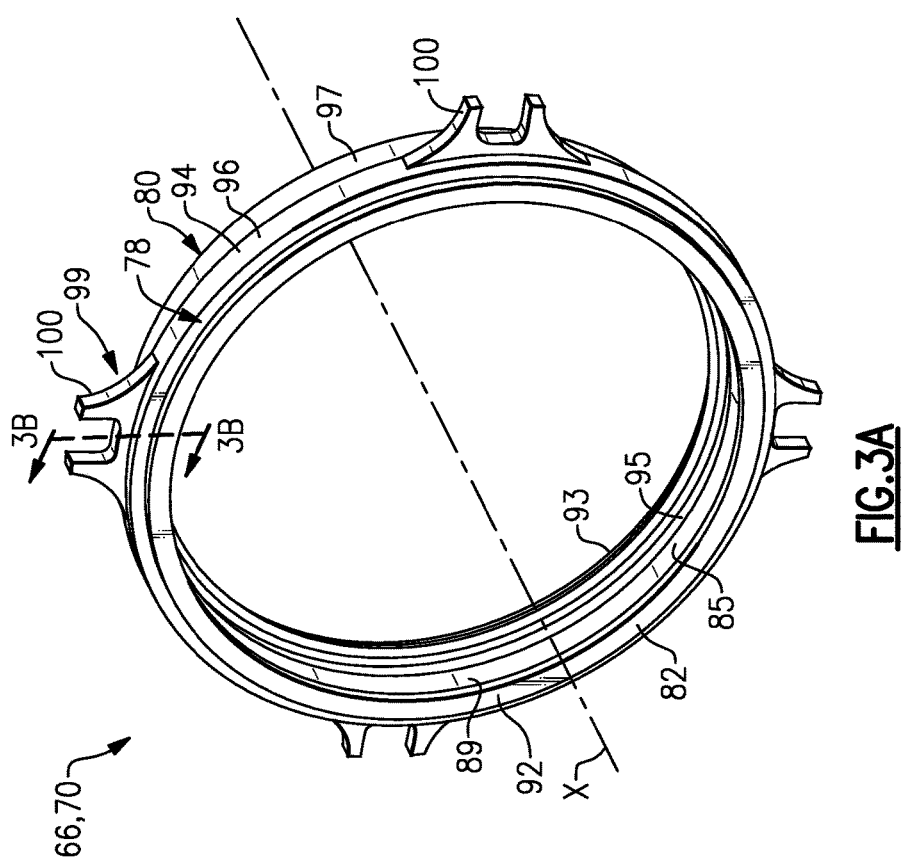
FIG. 3A illustrates a perspective view of a seal assembly according to a first example.

Referring to FIGS. 3A and 3B, with continued reference to FIG. 2, the seal carrier 80 extends about and is mechanically attached to an outer diameter 88 of the seal member 78. In one example, the seal member 78 is press fit into an inner diameter 90 of the seal carrier 80. In other examples, the seal member 78 is bonded to the seal carrier 80 with epoxy. In one example, a circumferentially extending retention plate 79 (shown in dashed lines in FIG. 3B) is mechanically attached to seal carrier 80 to secure the seal member 78.

The seal carrier 80 includes an annular carrier body 94 that extends between a first end portion 94A and a second end portion 94B to define an outer diameter 96 of the seal carrier 80. The first end portion 94A can taper into a circumferential flange that at least partially surrounds the seal member 78. The seal carrier 80 includes an annular shoulder 98 that extends inwardly from the carrier body 94.

The seal member 78 includes an annular seal body 89 and an annular contacting portion 92. The seal body 89 is dimensioned to abut against the shoulder 98 of the seal carrier 80 when in an installed position. In some examples, a small gap is defined between the rear face of seal body 89 and the shoulder 98 when installed. The contacting portion 92 extends axially from the seal body 89 to define the seal face 82. Surfaces of the seal body 89 and the contacting portion 92 can be in a stepped relationship such that the contacting portion 92 has a lesser inner diameter and/or a lesser outer diameter with respect to inner and outer diameters 85, 88 of the seal body 89.

The seal assembly 66 can include a secondary seal member 93 (portion shown in FIGS. 3B and 3A). The secondary seal member 93 can have a generally arcuate or ring-shaped geometry, and extends from a portion of the seal housing 68 (FIG. 2). One of the seal carrier 80 and the seal member 78 can define a secondary seal seat 95. The secondary seal seat 95 is dimensioned to abut against radially outer surfaces of the secondary seal member 93 to at least partially seal the annular groove 74 (FIG. 2) between a first axial position and a second, different axial position relative to the axis X. The secondary seal member 93 can have a generally C-shaped or arcuate cross-sectional geometry with portions that are deflectable in response to contact with surfaces of the secondary seal seat 95. The secondary seal member 93 can also engage surfaces of the secondary seal seat 95 to substantially center the seal 70 relative to the axis X.

In the illustrated example of FIG. 3A-3B, the seal carrier 80 includes an elongated ring or secondary portion 97 that extends axially from the second end portion 94B. The secondary portion 97 defines the secondary seal seat 95. The secondary portion 97 can have a generally ring-shaped geometry. The seal carrier 80 can define a shoulder 91 to abut against the secondary seal member 93.

Figure 4:
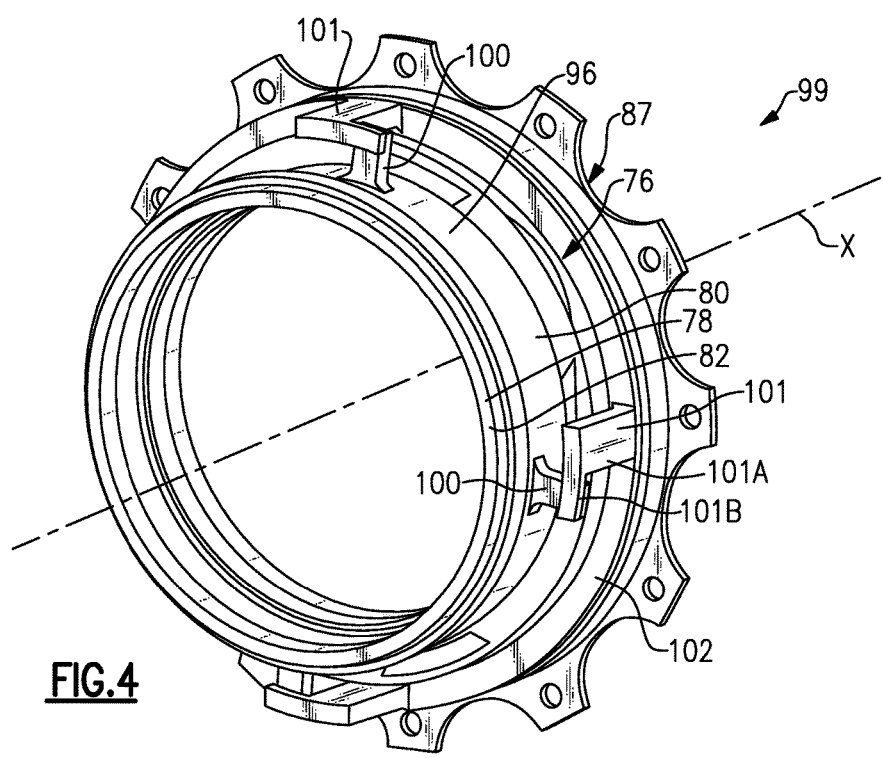
FIG. 4 illustrates a retention arrangement of the seal assembly of FIG. 2.

Referring to FIG. 4, with continued reference to FIGS. 2 and 3A-3B, the seal assembly 66 can include a retention arrangement 99 for securing the seal 70 in the annular groove 74 of the seal housing 68. The seal carrier 80 includes one or more scallops 100 that are circumferentially distributed about, and extend outwardly from, the outer diameter 96 of the seal carrier 80. The retention member 87 includes one or more retention posts or hooks 101 that are arranged to oppose movement of the seal carrier 82 relative to the seal housing 68. The retention hooks 101 are circumferentially spaced apart and extend outwardly from a radial face 102 of the retention member 87. In the illustrated example of FIG. 4, each of the retention hooks 101 has a generally L-shaped geometry including an axially extending first portion 101A and a circumferentially extending second portion 101B. Each of the retention hooks 101 receives respective one of the scallops 100 to oppose axial movement of the seal carrier 80 relative to the axis X during assembly (e.g., prior to seal face 82 of seal member 78 abutting against the seal seat 84).

During assembly, the scallops 100 are moved axially toward radial face 102 until the scallops 100 are past the second portion 101A of each retention hook 101. Thereafter, the seal carrier 80 is rotated relative to the axis X to secure the scallops 100 against the retention hooks 101. The spring member 76 biases the scallops 100 against the second portion 101B of each respective retention hook 101 to secure the seal carrier 80.

The seal assembly 66 operates as follows. The spring member 76 biases the seal carrier 80 away from the seal housing 68 and toward the rotatable member 86 such that seal face 82 directly contacts the seal seat 84 during relative rotation of the seal seat 84 and the seal face 82. A first sealing relationship along the fluid passage FP is established in response to axial movement of the seal member 78 along the axis X and abutment of the seal face 82 against the seal seat 84. A second sealing relationship along the fluid passage FP is established between the secondary seal seat 95 and the secondary seal member 93.

Figure 5B:
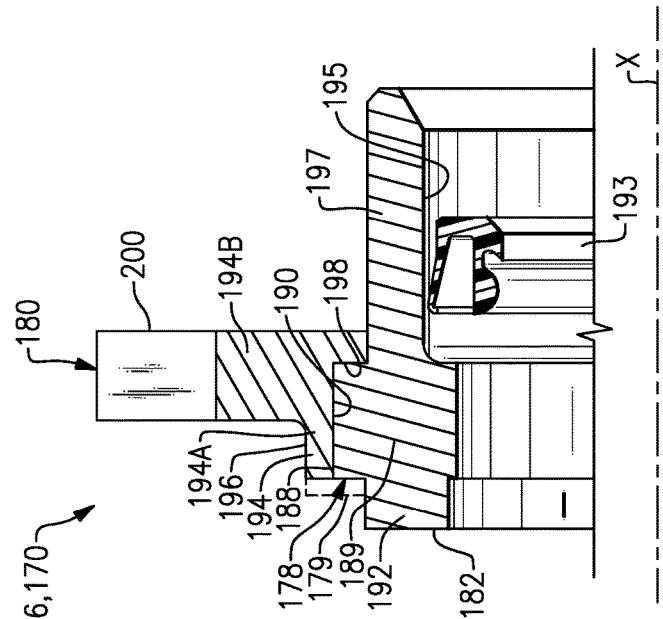
FIG. 5B illustrates a sectional view of the seal assembly of FIG. 5A along line 5B-5B.
Figure 5A:
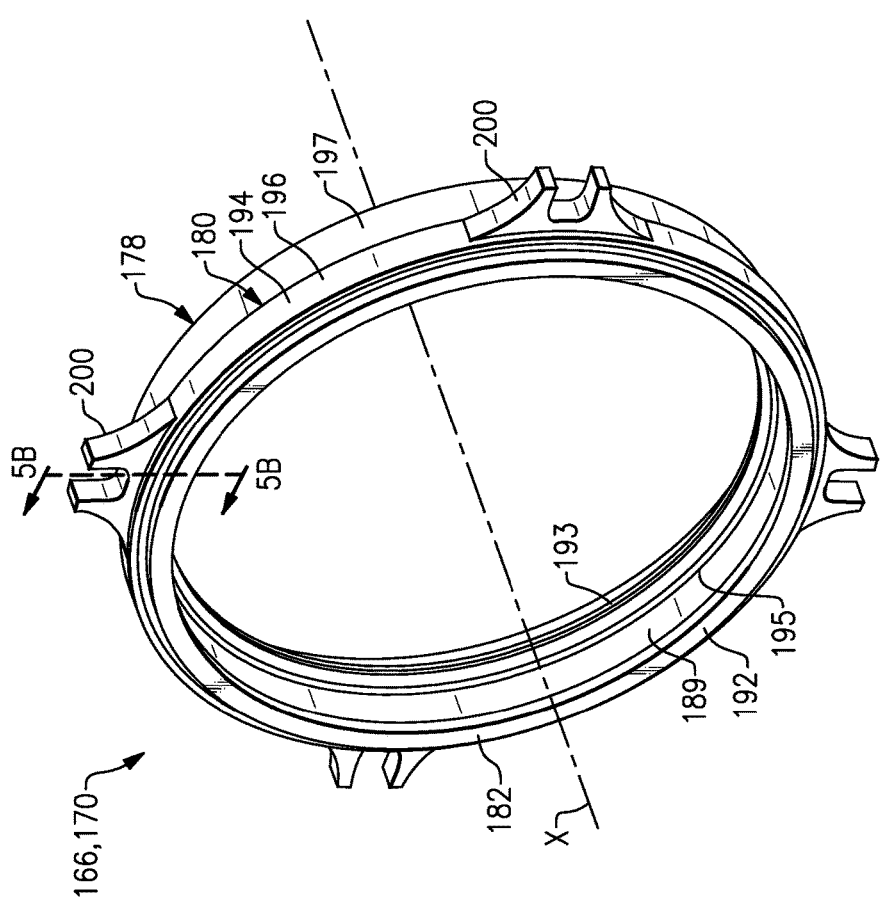
FIG. 5A illustrates a perspective view of a seal assembly according to a second example.

FIGS. 5A and 5B illustrate a seal assembly 166 according to a second example. Seal member 178 includes a secondary portion 197 that extends axially from seal body 189 to define a secondary seal seat 195. The secondary seal seat 195 abuts against a secondary seal member 193 to seal annular groove 74 defined by seal housing 68 (FIG. 2).

Each of the seals 70, 170 can include only two pieces, with the seal carrier 80, 180 being separate and distinct from the seal member 78, 178. Each of the seal carrier 80, 180 and the seal member 78, 178 can be monolithically formed, or can each be made of two or components.

The seal member 78, 178 can include a first material, and the seal carrier 80, 180 can include a second, different material. The second material can have a lesser or greater density than the first material. The second material can be selected to have a relatively higher strength than the first material, which can result in a relatively lesser overall mass of the seal 70, 170 as compared to a seal in which the first material is the same as the second material. The first material of the seal member 78, 178 may comprises carbon, such as carbon graphite, for example. The second material of the seal carrier 80, 180 may comprise metal, such as titanium, stainless steel (e.g., meeting AMS 5613 standard), an aluminum alloy, or an iron-nickel alloy, for example. In some examples, the seal carrier 80, 180 defines at least 15 percent of a volume of the seal 70, 170, or more narrowly between 40-90 percent of the volume, for example. In the illustrated example of FIGS. 3A-3B, the seal carrier 80 defines between about 75-85 percent of the volume of seal 70. In the illustrated example of FIGS. 5A-5B, the seal carrier 180 defines between about 45-55 percent of the volume of the seal 170.

Fabrication of the seal carrier 80, 180 with material having a relatively greater density than material of the seal member 78, 178 can reduce an overall mass of the seal 70, 170 as compared to a seal in which the first material is the same as the second material. Seal carrier 80, 180 has a relatively greater density than the carbon in seal member 78, 178. The seal carrier 80, 180 can be fabricated in materials of lesser density, such as use of titanium as compared to steel, to reduce the overall mass of the seal 70, 170. A reduction in the overall mass of the seal 70, 170 can reduce a moment of inertia of the seal 70, 170 and can reduce a spring load of spring member 76 for keeping the seal member 78, 178 seated against and in contact with the seal seat 84. The reduced spring load can reduce frictional forces and wear on the seal member 78, 178. The reduced spring load can also reduce heat generation, and can reduce lubricant flow that may be used to cool surrounding portions of the bearing compartment BC and the seal assembly 66.

Although a number of embodiments have been described above, other implementations, modifications and variants are possible in light of forgoing teachings. For example, although the bearing assembly, the seal assembly and bearing compartment are primarily discussed with respect to a lubricant flow or airflow, the concepts and teachings herein may be implemented or otherwise used for non-oil applications as well.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A seal assembly for a gas turbine engine comprising:
   a seal housing that extends about an axis, the seal housing defining an annular groove;
   a contacting-type seal at least partially received in the annular groove, the seal including a seal member and a seal carrier extending about and mechanically attached to an outer diameter of the seal member, the seal member defining an annular seal face that is moveable along the axis to abut against a seal seat;
   a secondary seal member extending from the seal housing;
   wherein the seal member includes a secondary portion defining a secondary seal seat, and the secondary seal member abuts against the secondary seal seat along an inner periphery of the secondary portion to at least partially seal the annular groove; and
   wherein the seal member includes a first material, and the seal carrier includes a second, different material having a greater density than the first material.

2. The seal assembly as recited in claim 1, wherein the first material of the seal member comprises carbon.

3. The seal assembly as recited in claim 2, wherein the second material of the seal carrier comprises metal.

4. The seal assembly as recited in claim 1, comprising a spring member received in the annular groove, wherein the spring member abuts against the seal carrier and biases the seal member against the seal seat.

5. The seal assembly as recited in claim 1, wherein:
the seal carrier includes an annular carrier body that extends between a first end portion and a second end portion to define the outer diameter of the seal carrier, and includes an annular shoulder that extends inwardly from carrier body; and
the seal member includes an annular seal body and an annular contacting portion, the seal body abutting against a shoulder of the seal housing, the contacting portion extending axially from the seal body to define the seal face, and the contacting portion having a lesser inner diameter and a lesser outer diameter with respect to the seal body.

6. The seal assembly as recited in claim 5, wherein the seal member is press fit into an inner diameter of the seal carrier.

7. The seal assembly as recited in claim 1, wherein the seal carrier includes one or more scallops circumferentially distributed about an outer diameter of the seal carrier, and the seal housing defines one or more retention hooks receiving a respective one of the one or more scallops to oppose movement of the seal carrier relative to the seal housing.

8. The seal assembly as recited in claim 7, comprising a spring member received in the annular groove, wherein the spring member abuts against the seal carrier and biases the seal member against the seal seat, and wherein the spring member biases the one or more scallops against the one or more retention hooks.

9. The seal assembly as recited in claim 8, wherein the one or more scallops includes a plurality of scallops, the one or more retention hooks includes a plurality of retention hooks each having a first portion extending axially from the seal housing and a second portion extending circumferentially from the first portion to define a channel, and each scallop of the plurality of scallops is received in the channel of a respective one of the plurality of retention hooks to bound circumferential movement of the seal carrier relative to the axis.

10. The seal assembly as recited in claim 5, wherein the secondary portion being elongated along the axis.

11. The seal assembly as recited in claim 10, wherein:
the first material of the seal member comprises carbon;
the second material of the seal carrier comprises metal; and
the seal member is dimensioned such that the annular seal face and the secondary portion are on opposed sides of the seal carrier with respect to the axis.

12. The seal assembly as recited in claim 11, wherein the seal member is press fit into an inner diameter of the seal carrier.

13. A gas turbine engine comprising:
a fan section including a fan rotatable about an engine axis;
a compressor section in fluid communication with the fan section;
a turbine section driving the fan section; and
a seal assembly comprising:
a seal housing defining an annular groove;
a contacting-type seal that extends about the engine axis, the seal including a seal member mechanically attached to a seal carrier, the seal carrier slideably received in the seal housing, the seal member defining a seal face that is moveable along the axis to abut against a rotatable seal seat;
a secondary seal member that extends from the seal housing;
wherein the seal member defines a secondary seal seat, and the secondary seal member abuts against the secondary seal seat along an inner periphery of the seal member to at least partially seal the annular groove between a first axial position and a second, different axial position relative to the engine axis; and
wherein the seal member includes a first material comprising carbon, and the seal carrier includes a second, different material.

14. The gas turbine engine as recited in claim 13, wherein the second material has a greater density than the first material.

15. The gas turbine engine as recited in claim 14, wherein the second material of the seal carrier comprises metal.

16. The gas turbine engine as recited in claim 13, wherein the seal housing is mechanically attached to a static structure of the engine.

17. The gas turbine engine as recited in claim 13, comprising a bearing assembly including at least one bearing located in bearing compartment and a rotatable member defining the seal seat.

18. The gas turbine engine as recited in claim 13, comprising:
a spring member received in the annular groove, wherein the spring member biases the seal member against the seal seat.

19. A method of sealing for a gas turbine engine comprising:
establishing a first sealing relationship along a fluid passage in response to contact between a contacting-type seal and a seal seat;
wherein the contacting-type seal includes a seal member mechanically attached to a seal carrier, the seal member defining a seal face that is moveable to abut against the seal seat;
establishing a second sealing relationship along the fluid passage between a secondary seal seat defined by an inner periphery of the seal member and a seal housing attached to a static structure; and
wherein the seal member includes a first material comprising carbon, and the seal carrier includes a second, different material having a greater density than the first material.

20. The method as recited in claim 19, wherein the step of establishing the first sealing relationship includes biasing the seal carrier away from the seal housing such that the seal face directly contacts the seal seat during relative rotation of the seal seat and the seal face.

* * * * *